United States Patent
Dietrich et al.

(10) Patent No.: US 6,821,656 B2
(45) Date of Patent: Nov. 23, 2004

(54) MATERIAL FOR THERMALLY LOADED SUBSTRATES

(75) Inventors: Markus Dietrich, Jülich (DE); Robert Vassen, Herzogenrath (DE); Detlev Stöver, Niederzier (DE)

(73) Assignee: Forschungszentrum Julich GmbH, Julich (DE)

( * ) Notice: Subject to any disclaimer, the term of this patent is extended or adjusted under 35 U.S.C. 154(b) by 0 days.

(21) Appl. No.: 10/416,088

(22) PCT Filed: Nov. 8, 2001

(86) PCT No.: PCT/DE01/04228

§ 371 (c)(1),
(2), (4) Date: May 6, 2003

(87) PCT Pub. No.: WO02/40745

PCT Pub. Date: May 23, 2002

(65) Prior Publication Data

US 2004/0043261 A1 Mar. 4, 2004

(30) Foreign Application Priority Data

Nov. 15, 2000 (DE) .......................................... 100 56 617

(51) Int. Cl.⁷ .............................................. B32B 15/04
(52) U.S. Cl. ........................ 428/701; 428/702; 428/632; 428/697; 428/699; 416/241 B
(58) Field of Search .................................. 428/469, 632, 428/701, 702, 697, 699, 680; 416/241 B; 106/286.8; 501/152

(56) References Cited

U.S. PATENT DOCUMENTS

| | | | | |
|---|---|---|---|---|
| 4,197,957 A | * | 4/1980 | Buhrer | .................. 220/2.1 R |
| 4,211,758 A | * | 7/1980 | Buhrer | ...................... 423/263 |
| 5,213,712 A | * | 5/1993 | Dole | .................. 252/301.4 R |
| 5,244,753 A | | 9/1993 | Taniguchi et al. | |

FOREIGN PATENT DOCUMENTS

| | | |
|---|---|---|
| DE | 196 40 926 | 1/1998 |
| EP | 0 919 647 | 6/1999 |
| JP | 10027886 | 1/1998 |

* cited by examiner

*Primary Examiner*—Jennifer McNeil
(74) *Attorney, Agent, or Firm*—Herbert Dubno

(57) ABSTRACT

The invention relates to a material, in particular for a thermal insulation layer, with increased thermal stability, a low heat conductivity and a large thermal coefficient of expansion. According to the invention, said material comprises lanthanides, in particular the elements La, Ce, Nd, Yb, Lu, Er or Tm, which preferably occur as a mixture in a Perovskite structure. Said thermal insulation layer is particularly suitable for replacing thermal insulation layers comprising yttrium stabilized zirconium oxides (YSZ) as the thermal stability thereof is given as well over 1200° C.

12 Claims, No Drawings

MATERIAL FOR THERMALLY LOADED SUBSTRATES

CROSS REFERENCE TO RELATED APPLICATIONS

This application is a national stage of PCT/DE 01/04228 filed 8 Nov. 2001 and is based upon German National application 100 56 617.0 of 15 Nov. 2000 under the International Convention.

FIELD OF THE INVENTION

The invention relates to a material based on perovskites as thermally insulating layers or heat barriers for the protection of thermally loaded or stressed substrates, especially for use in a gas turbine.

BACKGROUND OF THE INVENTION

To increase the efficiency of stationary and cantilevered gas turbines, at the present time increasingly higher gas temperatures are being used in these machines. For this purpose components of the turbine are provided with thermally insulating layers (TIL) which as a rule are comprised of yttrium stabilized zirconium oxides (YSZ). A bond-promoting layer (BL) of an MCrAlY alloy (M=Co, Ni) or an aluminide layer can be provided between the substrate and the thermally insulating layer to serve primarily as oxidation protection for the substrate. With these systems to date, surface temperatures of the turbine components up to 1200° C. can be utilized.

A further increase to above 1300° C. is desirable but cannot be achieved with the existing materials, especially with YSZ. The zirconium oxide which is deposited by plasma spraying or electron beam vapor deposition undergoes at temperatures above 1200° C. a phase transformation which within the operating life gives rise to deterioration of the coating. At equal thermal conductivities of the heat insulation layer and equal layer thicknesses, higher surface temperatures give rise to higher temperatures in the bonding layer and the substrate. These temperature increases also contribute to an accelerated deterioration of the bond of the material.

As a consequence, new materials are being sought on a world wide basis which can redeem the partially stabilized zirconium oxide as a material for a thermal insulation layer.

OBJECTS OF THE INVENTION

The object of the invention is to provide a material for a thermal insulation layer which fulfills the requirements of a low thermal conductivity, a high thermal expansion coefficient and substantially a phase stability to temperatures above 1300° C. It is also an object of the invention to provide thermally stressed components with such a thermal insulation layer.

SUMMARY OF THE INVENTION

In the framework of the invention it has been found that the oxides of rare earth elements (Sc, Y) which are available in a perovskite structure comprise materials which have especially advantageous characteristics for a thermal insulation or thermal barrier layer.

The material according to the invention is thus characterized by a perovskite structure. This has the general formula $ABO_3$. The A and B positions can include typically a multiplicity of elements. The layer can have at least one element from the group of the lanthanides for the A position or B position.

The lanthanide group together with elements scandium and yttrium also make up the group named as rare earths. The lanthanides are elements with atomic numbers 57–71 of the Periodic System of the Elements.

For the formation of a perovskite structure, cations of different sizes are required for the A and B position. Especially, a large cation is required for the A position and an average size cation for the B position. The oxides of the rare earths and their mixtures (rare earth mixtures) crystallize usually depending upon the ionic diameter and temperature in three different structures, the hexagonal A form, the monoclinic B form and the cubic C form.

Within the framework of the invention it has been found that a rare earth mixture with clearly different ionic radii and with a stoichiometric ratio of about 1:1 will crystallize out in perovskite structure with the general formula $ABO_3$.

A perovskite is thus formed advantageously when in the material the A position is provided with the larger cations of La, Ce or Nd, and the B position includes the cations of Yb, Lu, Er or Tm.

Especially advantageous perovskite structures as $LaYO_3$, $LaLuO_3$, $LaErO_3$, $LaTmO_3$, $CeYO_3$, $CeLuO_3$, $CeErO_3$, $CeTmO_3$, $PrYO_3$, $PrLuO_3$, $PrErO_3$, $PrTmO_3$, $NdYO_3$, $NdLuO_3$, $NdErO_3$, and $NdTmO_3$.

A further advantageous conformation of the material is a mixed perovskite in which the A and/or B positions are provided with at least two different lanthanides. Especially for A=A'=A"=(La, Ce, Pr, Nd) at the A-position and/or B=B'=B"=(Er, Tm, Yb, Lu) at the B-position, an especially suitable material will result.

The advantageous perovskite structure of the material of the invention is characterized especially by a high melting temperature. The melting temperature for the material depending upon its composition can be above 1800° C. and especially above 2000° C. Up to the range in which the material reaches its melt temperature, such materials advantageously do not undergo phase transformation and thus can be employed for corresponding purposes, especially as heat insulating layers.

In a further advantageous conformation of the material, the material has a thermal expansion coefficient in excess of $8.5 \times 10^{-6}$ $K^{-1}$. As a further advantageous feature it also has a thermal conductivity of less than 2.2 W/mk.

A material with these characteristics is especially well suited as a thermal insulation layer on a metal substrate since the matched thermal expansion coefficient reduces mechanical stresses between the two materials upon temperature increase and the reduced thermal conductivity usually prevents an overheating of the substrate.

The component of the invention can have a layer on the surface comprised of a material as has been described.

Such a layer is a highly effective thermal insulating layer for thermally loaded components which also must not undergo phase transformation until well over 1200° C. Because of the reduced thermal conductivity of this layer high temperatures are prevented as a rule from reaching the component surface. This permits an efficient operation of the machine and/or a longer useful life of the component.

Advantageously the material of the component and the layer have similar thermal expansion coefficients. This prevents stresses of thermal origin from breaking away the layer from the component surfaces.

Advantageously, between the layer according to the invention and the component, at least one further layer is provided which for example acts as a bond-promoting layer which improves the adhesion between the individual layers and functions as an oxidation protection for the substrate.

A suitable material for such an adhesion promoting layer is an alloy with the general formula MCrAlY. The M in this formula signifies either nickel or cobalt, Cr is chromium, Al stands for aluminum and Y signifies Yttrium. A bond-promoting layer of this material is especially thermally resistant and advantageously matches the thermal expansion coefficients of the layers bordering it.

An intermediate layer of aluminide is also advantageous.

The material according to the invention (lanthanide-perovskite) can advantageously also be used as the uppermost layer in a multilayer system which is applied to a substrate. This multilayer system can be comprised of a bond-promoting layer and at least two further layers. In the simplest case a two-layer system of a first YSZ layer directly on the bond-promoting layer and a further oxide layer, like for example $La_2Zr_2O_7$, as a second layer can be used.

Also an advantageously continuous transition can be fabricated between these layers in the form of concentration gradients. A suitable embodiment of the component has a layer provided on the surface which has a concentration of lanthanides starting from that at the interface between the component and the layer which increases toward the surface of the layer. Thus this layer has a concentration gradient with respect to the lanthanide.

The thermally insulating layer is advantageously provided on the surfaces of components of a gas turbine. As a result such gas turbines can operate with higher gas temperatures especially gas temperatures above 1200° C. Higher gas temperatures mean advantageously an improvement in the efficiency of a gas turbine.

EXAMPLES

The material according to the invention of lanthanide-perovskite has usually an elevated melting temperature greater than 2000° C. and shows in the range of room temperature to the melting temperature, no phase transformation. Its thermal conductivity is very low. At 1.45 W/mK it lies, in the case of $LaYbO_3$ significantly below that of YSZ (2.1 W/mK) the present-day standard thermal insulating material.

The thermal expansion coefficient of $LaYbO_3$ is measured at $10 \times 10^{-6}$ $K^{-1}$. That is very high for a ceramic so that its difference from that of a metallic substrate material (component) onto which the layer is sprayed, can be held very low. This enables a reduction of thermally induced stresses in the thermal insulating layer.

It has been found further that for example $LaYbO_3$ can be sintered only poorly in the temperature range up to 1300° C. This is however advantageous for its use as a thermal insulating layer. Thermal insulating layers have as a rule a porosity in the order of magnitude of 15%. As a result of this porosity the thermal conductivity is lowered on the one hand and on the other hand stress reduction can be effected by local crack formation. A poor sinterability means that the porosity will be retained.

The uniqueness of the perovskites of the rare earths resides in the continuous interchangeability of the rare earth ions between those of the A position and those of the B position, since the rare earth ions are very similar with respect to their outer electron configurations. Thus for example the La in $LaYbO_3$ can be continuously replaced by Nd or Yb by Lu. The substrate perovskites can be described by the general formula $A'_xA''_{1-x}B'_yB''_{1-y}O_3$ with $0 \leq x,y \leq 1$. This variability enables a variation in the thermophysical properties of the rare earth perovskites and thus their optimization.

Thermally insulating layers based upon lanthanide, perovskite in accordance with the invention can be produced in various ways and kinds:

Example A

$LaYbO_3$ Thermal Insulating Layer

The $LaYbO_3$ is formed by a solid body reaction corresponding to $La_2O_3 + Yb_2O_3 \rightarrow 2\ LaYbO_3$.

The starting powders are ground in a ball mill with ethanol and then heated to 1400° C. to effect the reaction at a glowing temperature. Then a flowable powder is produced by spray drying.

First by low pressure plasma spraying=vacuum plasma spraying (LPPS) a bond promoting layer of continuously available MCrAlY powder is applied to a substrate (nickel-based alloy). Then the ceramic layer of the lanthanide perovskite is applied in a thickness of about 0.3 mm by means of atmospheric plasma spraying (APS) onto the bond-promoting layer (BL).

Example B

$LaLuO_3$ Thermal Insulating Layer

The $LaLuO_3$ powder is produced by spray drying an aqueous $La(NO_3)_3$ and $Lu(NO_3)_3$ solution with subsequent calcination at 1400° C. From this powder ingots for electron beam physical vapor deposition (EB-PVD) or electron beam PVD were produced.

As the bond-promoting layer, by a low pressure plasma spray=vacuum plasma spray (LPPS) and subsequent smoothing, a platinum aluminide layer was applied.

The substrate provided with the bond-promoting layer was coated with the $LaLuO_3$ ingots by the electron beam plasma vapor deposition (EB-PVD).

Example C

Multilayer or Graded Coating $PrLuO_3$ was produced like the $LaYbO_3$ in example A). Again by means of LPPS (low pressure plasma spray=vacuum plasma spray) a bond-promoting layer was applied of MCrAlY-powder with M=Ni or Co, to a substrate (nickel based alloy).

Onto this bond promoting layer by means of atmospheric plasma spray, initially a YSZ layer was applied and then with the same method a $PrLuO_3$ layer was applied. In a similar way it is possible to spray the two oxides with a continuous concentration gradient from YSZ and $PrLuO_3$ and thus obtaining a graded insulation.

What is claimed is:

1. A component comprising a heat-sensitive substrate and a thermally insulating layer on said substrate consisting of a material with a perovskite structure of the general formula $ABO_3$ and a phase stability up to 1200° C., wherein exclusively rare earth elements are present at both the A and B positions.

2. The component according to claim 1 wherein said material has at least one element from the group A=La, Ce, Pr, Nd in the A-position and an element from the group B=Er, Tm, Yb, Lu in the B position.

3. The component according to claim 2 wherein said material is one of the compounds $LaYbO_3$, $LaLuO_3$, LaErO$_3$, LaTmO$_3$, CeYbO$_3$, CeLuO$_3$, CeErO$_3$, CeTmO$_3$, PrYbO$_3$, PrLuO$_3$, PrErO$_3$, PrTmO$_3$, NdYbO$_3$, NdLuO$_3$, NdErO$_3$ or NdTmO$_3$.

4. The component according to claim 1 wherein said material has a perovskite structure with the general formula A'$_x$A"$_{1-x}$B'$_y$B"$_{1-y}$O$_3$ with $0 \leq x,y \leq 1$ and at least two different elements from the group A=A'=A"=La, Ce, Pr, Nd in the A-Position and/or two different elements from the group B=B'=B"=Er, Tm, Yb, Lu in the B-Position.

5. The component according to claim 1 wherein said material has a melting temperature above 1800° C.

6. The component according to claim 1 by wherein said material has a thermal expansion coefficient of greater than $8.5 \times 10^{-6}$ K$^{-1}$.

7. The component according to claim 1 wherein said material has a thermal conductivity of less than 2.2 W/mk.

8. The component according to claim 1, further comprising at least one intermediate layers of ceramic, glass or metallic material disposed between the substrate and the thermally insulating layer.

9. The component according to claim 8 whereby a MCrAlY— alloy forms the intermediate layer, M being an element from the group of Co and Ni.

10. The component according to claim 8 wherein an aluminide layer forms said intermediate layer.

11. The component according to claim 8 wherein the thermally insulating layer and the intermediate layer have has an increasing concentration of lanthanides from the component/layer interface to the surface of the thermally insulating layer.

12. The component according to claim 1 wherein said component is a part of a gas turbine.

* * * * *